(12) United States Patent
Suteerawanit

(10) Patent No.: US 11,678,654 B1
(45) Date of Patent: Jun. 20, 2023

(54) TRAP DOOR MULTI-CATCH RODENT TRAP

(71) Applicant: Nick Suteerawanit, Los Angeles, CA (US)

(72) Inventor: Nick Suteerawanit, Los Angeles, CA (US)

( * ) Notice: Subject to any disclaimer, the term of this patent is extended or adjusted under 35 U.S.C. 154(b) by 0 days.

(21) Appl. No.: 17/881,781

(22) Filed: Aug. 5, 2022

(51) Int. Cl.
*A01M 23/12* (2006.01)
*A01M 23/04* (2006.01)

(52) U.S. Cl.
CPC .......... *A01M 23/12* (2013.01); *A01M 23/04* (2013.01)

(58) Field of Classification Search
CPC ...... A01M 23/02; A01M 23/04; A01M 23/12; A01M 23/14; A01M 23/00
USPC ..................... 43/59–61, 64–66, 69
See application file for complete search history.

(56) References Cited

U.S. PATENT DOCUMENTS

| | | | |
|---|---|---|---|
| 111,291 A * | 1/1871 | Williams | A01M 1/10 43/65 |
| 119,645 A * | 10/1871 | Rasmussen | A01M 23/04 43/69 |
| 135,732 A | 2/1873 | Da Silva | |
| 141,346 A | 7/1873 | Hannah | |
| 284,759 A | 9/1883 | Reed | |
| 331,945 A | 12/1885 | Crowe | |
| 338,399 A | 3/1886 | Gear | |
| 352,598 A | 11/1886 | Bell | |
| 376,246 A | 1/1888 | Kunderd | |
| 434,434 A | 8/1890 | Eads | |
| 662,279 A | 11/1900 | Lindsey | |
| 831,557 A * | 9/1906 | Kumpf | A01M 23/04 43/69 |
| 839,448 A * | 12/1906 | Aschenbrenner | A01M 23/04 43/69 |
| 886,381 A | 5/1908 | Little | |
| 1,045,662 A * | 11/1912 | Balint | A01M 23/38 43/98 |
| 1,077,912 A * | 11/1913 | Johansson | A01M 23/04 43/65 |
| 1,095,613 A * | 5/1914 | Witt | A01M 23/04 43/69 |

(Continued)

FOREIGN PATENT DOCUMENTS

| | | | | |
|---|---|---|---|---|
| CN | 113749067 A | * | 12/2021 | ............. A01M 1/20 |
| GB | 2439779 A | * | 1/2008 | ......... A01M 1/2005 |

OTHER PUBLICATIONS

Corsillo, Liza, "The Best Humane Mouse Traps and How to Use Them, According to Experts", The Strategist, https://nymag.com/strategist/article/best-humane-mouse-traps.html, published Oct. 31, 2018. (Year: 2018).*

*Primary Examiner* — Kathleen I Alker
(74) *Attorney, Agent, or Firm* — Averill, Green & Kim; Philip Y Kim; Kenneth L. Green

(57) ABSTRACT

A trap door rodent trap rests on a bucket and including bait for attracting rodents to climb entry ramps reaching up to the trap. Blue colored entries visible to the rodents creates confidence to continue onto the trap. A center trap door opens from the weight of the rodent and the rodent falls into a bucket supporting the trap. Euthanasia of the trapped rodents is delayed to avoid noxious odors preventing trapping additional rodents, and the bucket may contain food and water for sustain the rodents for a period of time before euthanizing.

17 Claims, 7 Drawing Sheets

(56) References Cited

U.S. PATENT DOCUMENTS

| | | | | |
|---|---|---|---|---|
| 1,168,252 A | * | 1/1916 | Erdley | A01M 21/00 43/65 |
| 1,553,012 A | * | 9/1925 | Trumbo | A01M 23/00 43/69 |
| 1,557,558 A | * | 10/1925 | Cherbonnier | A01M 23/00 43/69 |
| 1,571,130 A | * | 1/1926 | Lynn | A01M 23/00 43/69 |
| 1,592,397 A | * | 7/1926 | Vail | A01M 23/18 43/69 |
| 1,810,163 A | | 6/1930 | Englund | |
| 2,569,833 A | * | 10/1951 | Simpson, Sr. | A01K 69/06 43/65 |
| 2,576,524 A | * | 11/1951 | Lewis | A01K 69/06 43/66 |
| 2,584,498 A | * | 2/1952 | Posey | A01M 23/04 43/69 |
| 4,026,064 A | * | 5/1977 | Baker | A01M 25/004 43/131 |
| 4,103,448 A | | 8/1978 | Souza | |
| 4,154,016 A | * | 5/1979 | Reyes | A01M 23/04 43/69 |
| 4,372,074 A | | 2/1983 | Arrabit | |
| 4,541,198 A | | 9/1985 | Sherman | |
| 4,553,349 A | * | 11/1985 | Tsai | A01M 23/06 43/73 |
| 2006/0053682 A1 | | 3/2006 | Goldstein | |
| 2012/0117852 A1 | | 5/2012 | Baker | |
| 2016/0309694 A1 | * | 10/2016 | Azuela | A01M 1/145 |
| 2019/0223431 A1 | * | 7/2019 | Rustia | H04Q 9/00 |

\* cited by examiner

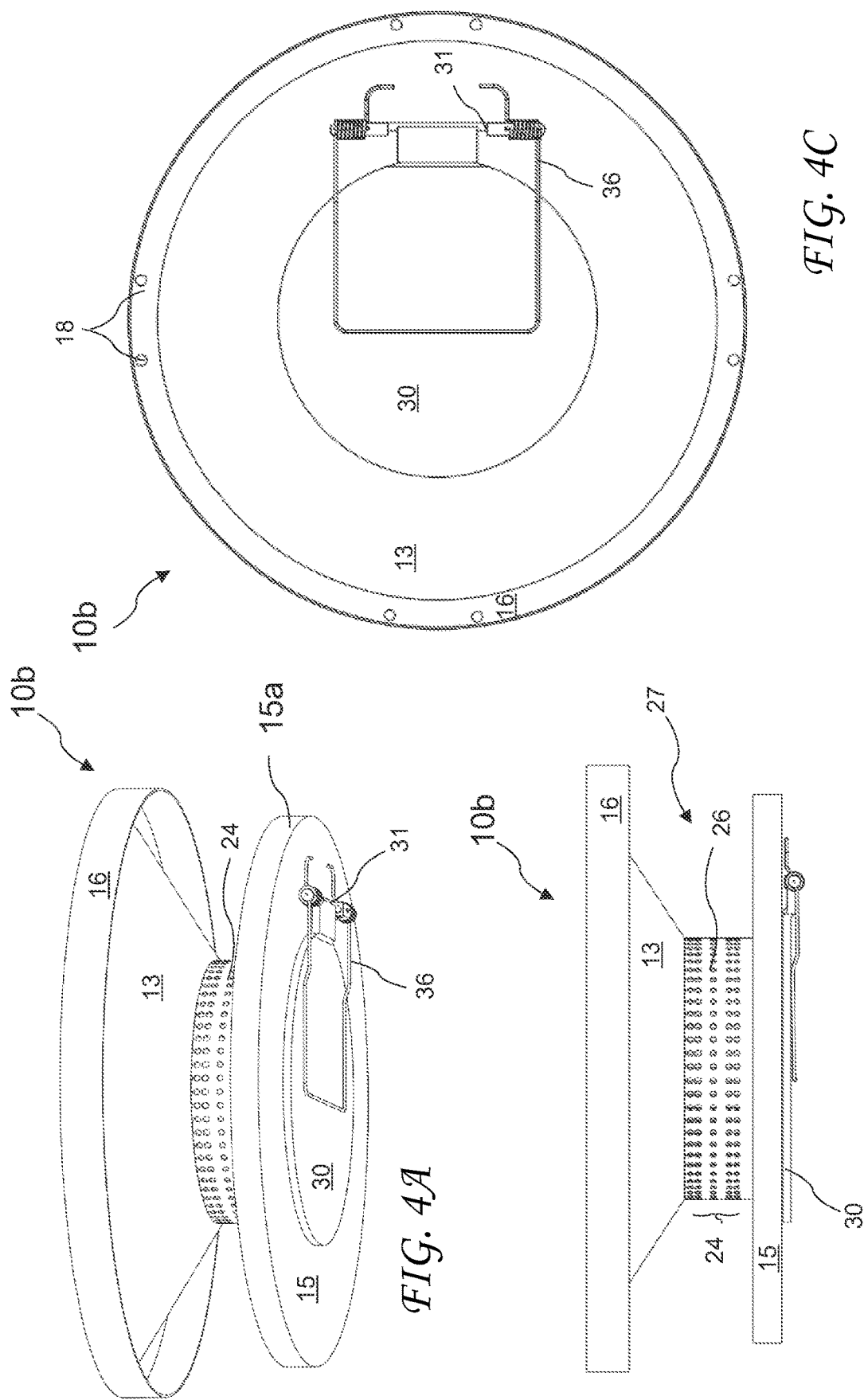

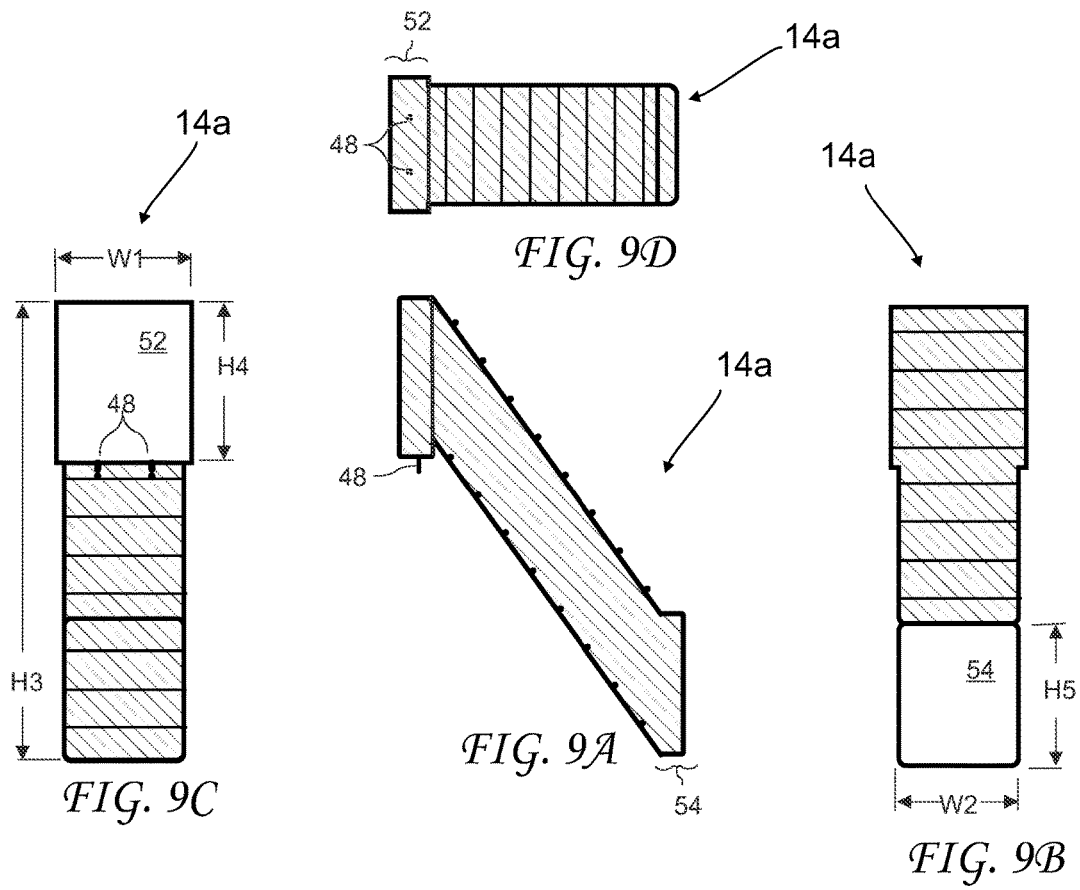
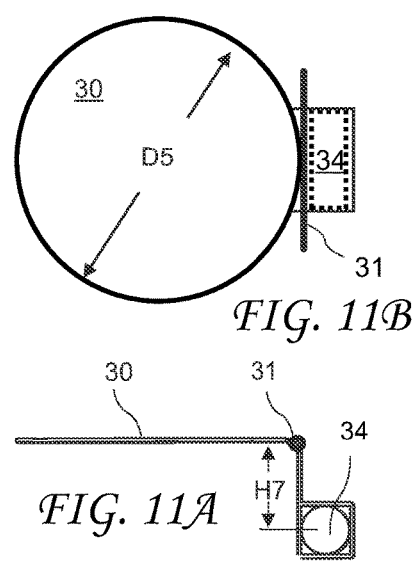
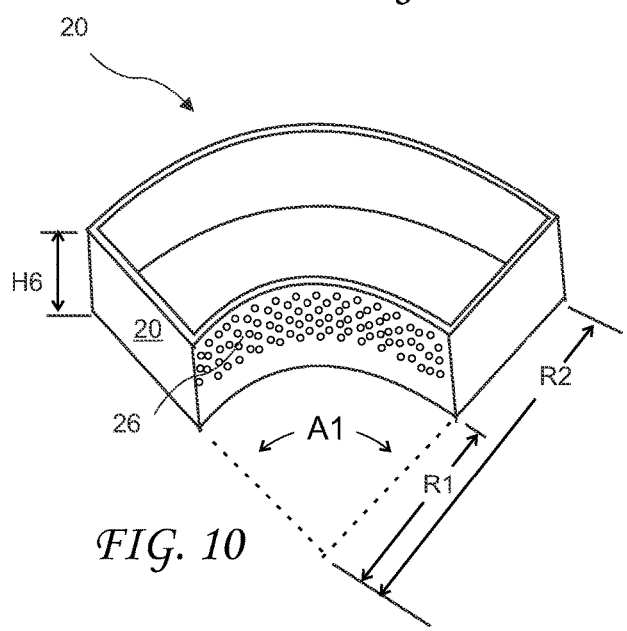

TRAP DOOR MULTI-CATCH RODENT TRAP

BACKGROUND OF THE INVENTION

The present invention relates to rodent traps and in particular to a rodent trap capturing multiple rodent.

Rodents can be found in and around every town and farm in the United States (U.S.) and it is estimated that there is one rodent for every person living in the U.S., and rodents have followed humans to almost all parts of the world. Rodents are so closely linked to humans they are called domestic rodents and humans supply their three basic needs: food; shelter; and water.

Rodents are a threat to health, and they interfere with our economic and physical well being. Rodents are destructive pests and serious safety hazards, rodents start fires by gnawing on electric cables, rodents eat large amounts of food, and rodents contaminate even more with food their urine, feces, and hair, and at least 20 percent of the world's food is eaten or contaminated by rodents each year. Rodents damage structures, books, furniture, even appliances, through gnawing and burrowing. Rodents spread disease to humans and other animals through their bite, by transporting fleas, lice, mites and ticks, and by leaving their droppings in food and other materials that humans contact. Rodents are vectors for bubonic plague, rat bite fever, leptospirosis, hantavirus, trichinosis, infectious jaundice, rat mite dermatitis, salmonellosis, pulmonary fever, and typhus. Mice have been linked to asthma, and rodents may bite babies in their cribs because the smell of milk or other food on the baby is attractive to a rodent looking for food.

Rodents can be found in our homes, supermarkets, restaurants, livestock pens, and farm fields. Warehouses, grain mills, elevators, silos and corncribs are especially vulnerable to rodent infestation. Rodents will eat anything humans or livestock eat. Rats in particular are active at night and are seldom seen during the day except when populations are exceedingly large. Rodents can crawl through very small crevices, which makes it hard to confine their movement. Even if rodents are unseen, they may be heard moving after dark. A pet may be aware of a lurking rodent, however cats and dogs are not much of a deterrent to rodents.

Rodents find their way into approximately 21 million U.S. homes each winter. According to a survey by the National Pest Management Association (NPMA), nearly one-third of Americans have had a rodent problem in their home. Different types of rodents typically invade homes during the fall and winter in search of food and shelter as the climate cools, although rodents can still pose problems throughout the rest of the year. The majority of homeowners surveyed reported rodent sightings in the kitchen, as well as the basement and living room to lesser extent.

Rodent problems inside a home or business can pose a significant threat to both health and property. Various types of common rodents are known to spread *Salmonella* and other bacteria. Rodents are also capable of triggering allergies and asthma attacks. Rodents can also carry disease-causing parasites, such as ticks, fleas and lice. In addition to these health threats, rodents are known to damage drywall as well as wood and can also chew through electrical wires, increasing the risk of electrical fires.

Proper rodent prevention measures and awareness are essential to keep both people and property safe. Rats can squeeze through openings the size of a quarter while mice can fit through holes as small as a quarter of an inch in width. Once inside, females can breed quickly. For example, a single female mouse can have as many as twelve young every three weeks, allowing infestations to quickly grow.

Deer mice are found throughout the United States. Deer mice prefer to nest in rural areas in places like old fence posts, tree hollows and log piles. Deer mice are rarely a problem in residential settings, but they can wander indoors during the winter months while searching for shelter and food. Deer mice will often take up residence in sheds, barns or cabins during the off season. Deer mice are the most common carrier of hantavirus, a group of viruses spread by rodents that can cause kidney, blood or respiratory ailments and can sometimes be fatal in humans. The virus is transmitted primarily by the inhalation of dust particles contaminated with the urine, feces or saliva of infected deer mice.

House mice are the most commonly encountered rodent species and can be found throughout the United States. House mice typically nest in dark, secluded areas inside of structures. House mice are excellent climbers and can jump up to a foot in height, allowing them to reach isolated or withdrawn areas. House mice can cause significant property damage by chewing through materials like drywall and insulation. Additionally, house mice have been known to spark electrical fires by gnawing on wires inside homes. House mice can also pose serious health threats, capable of contaminating stored food and spreading diseases such as *Salmonella*. House mice weight is typically 40-45 grams.

Norway rats are widespread and can be found throughout the United States. Norway rats are primarily nocturnal and often burrow into piles of garbage or underneath concrete slabs. Norway rats tends to enter homes in the fall when outdoor food sources become scarce, typically nesting in basements, crawlspaces and other undisturbed dwellings once inside. Norway rats can cause serious property damage by gnawing through various materials, including plastic and lead pipes. Norway rats are also vectors of disease, including the plague, jaundice, rat-bite fever and cowpox virus. Additionally, Norway rats can bring fleas and mites inside the home.

Roof rats can be found throughout the U.S. coastal states and southern third of the country. Roof rats typically live in colonies and prefer to nest in the upper areas of structures or trees. Historically, roof rats and the fleas they carry have been associated with the bubonic plague. Although cases are rare, roof rats can also spread diseases like typhus, jaundice and trichinosis.

The Black Death killed as many as 25 million people in Europe in the 1300s. Scientists believe the Black Death (also known as the Pestilence, the Great Mortality or the Plague, or bacterium *Yersinia pestis*) was a bubonic plague pandemic occurring in Afro-Eurasia from 1346 to 1353. It is the most fatal pandemic recorded in human history, causing the death of 75-200 million people in Eurasia and North Africa, peaking in Europe from 1347 to 1351. *Yersinia pestis* typically infects the Oriental rat flea, which in turn infects small rodents such as mice, rodents and squirrels. As their rodent hosts die, infected fleas seek and bite humans.

Rats are naturally nocturnal creatures, have poor eyesight, and can best see blues as blurry edges, and rats and mice are believed to be color blind. Rats use their limited sight and other senses to navigate the environment, find food, and recognize one another in the dark.

The most common way to deal with rodents is using poison. However, the poison may be reached by children, and other animals eating a poisoned rodent may be affected or killed by the poison. A rodent killed by poison may expire in a wall or attic space and produce an extremely noxious odor of sulfur dioxides, methane, and other noxious gases lasting for days or weeks and attracting flies into a home.

Some traps are capable of trapping and killing multiple rodents, but the mix of sulfur dioxides, methane, and other noxious gases from the dead rodents prevent additional rodents from entering the trap.

The extensive damage caused by rodents is evidence that better traps, not requiring poison, are needed, especially traps capable to catching multiple rodents and delaying euthanasia until the dead rodent can be promptly removed from the trap.

BRIEF SUMMARY OF THE INVENTION

The present invention addresses the above and other needs by providing a trap door rodent trap resting on a bucket and including bait for attracting rodents to climb entry ramps reaching up to the trap. Blue colored entries visible to the rodents creates confidence to continue onto the trap. A center trap door opens from the weight of the rodent and the rodent falls into a bucket supporting the trap. Euthanasia of the trapped rodents is delayed to avoid noxious odors preventing trapping additional rodents, and the bucket may contain food and water for sustain the rodents for a period of time before euthanizing.

In accordance with one aspect of the invention, there is provided rodent trap attracting rodents by scent. Bait resides in bait trays including perforations releasing rodent attracting scents into a central area of the trap. The scent attracts the rodents to a trap door centered in the trap.

In accordance with another aspect of the invention, there is provided rodent trap including blue ladders and a blue top. Rodents see the blue better than other colors and creates confidence in the rodents attracted by the bait to climb the ladders and onto the trap to reach the bait.

In accordance with yet another aspect of the invention, there is provided rodent trap having a trap door biased to a closed position. A sloping mouth around the trap top starts with a gradual slope to first provide confidence to rodents entering the trap and then increases to a steep slope leading the rodents to fall against and through the trap door. The weight of the rodent opens the trap door releasing the rodent to fall into the bucket supporting the trap.

In accordance with still another aspect of the invention, there is provided rodent trap capturing but not immediately killing the rodents. The rodents fall into a bucket, and may remain there for a day or longer. Avoiding killing the rodents avoids a mix of sulfur dioxides, methane, and other noxious gases from the dead rodents likely to prevent additional rodents from entering the trap. Water, seeds, and nuts may be left in the bucket to keep the rodents calm until they are euthanized.

In accordance with another aspect of the invention, there is provided rodent trap including a piano convex lens circling the top of the trap. The piano convex lens magnifies the contents of the bait trays to facilitate the rodents seeing bait in bait trays under the piano convex lens, attracting the rodents to climb onto the top of the trap. A top surface of the lens starts at a mild slope and increases to a greater slope to provide the sloping mouth to cause the rodents to stumble towards and trough the trap door. The piano convex lens is preferably made from a blue transparent material.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4A is a perspective bottom and side view a second capture portion of the trap door rodent trap according to the present invention.

FIG. 4B is a side view the second capture portion of the trap door rodent trap according to the present invention.

FIG. 4C is a bottom view the second capture portion of the trap door rodent trap according to the present invention.

FIG. 9A shows a side view of a ramp section according to the present invention.

FIG. 9B shows a front view of the ramp section according to the present invention.

FIG. 9C shows a rear view of the ramp section according to the present invention.

FIG. 9D shows a top view of the ramp section according to the present invention.

FIG. 10 shows a top and front view of the bait tray according to the present invention.

FIG. 11A shows a side view of a trap door and weight of the first capture portion according to the present invention.

FIG. 11B shows a top view of the trap door and weight of the first capture portion according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1:
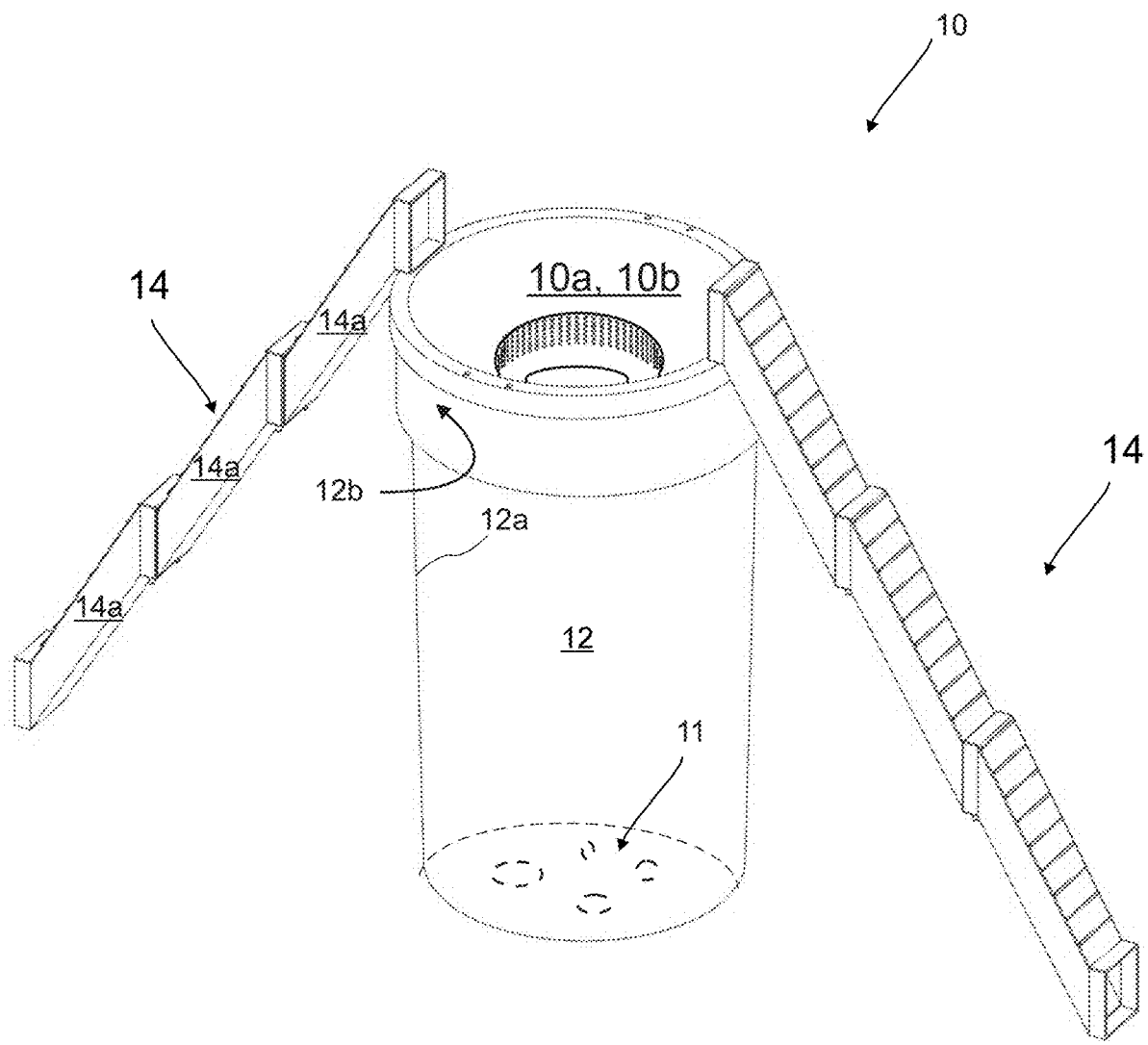
FIG. 1 is a perspective top and side view of a trap door rodent trap according to the present invention.

A perspective top and side view of a trap door rodent trap assembly 10 according to the present invention is shown in FIG. 1. The trap door rodent trap assembly 10 includes a capture portion 10a or 10b resting on top of a bucket 12 containing rodent food 11, and entry ramps 14. The entry ramps 14 preferable are assembled from ramps sections 14a. The bucket 12 has an interior surface 12a and a top edge 12b.

Figure 2B:
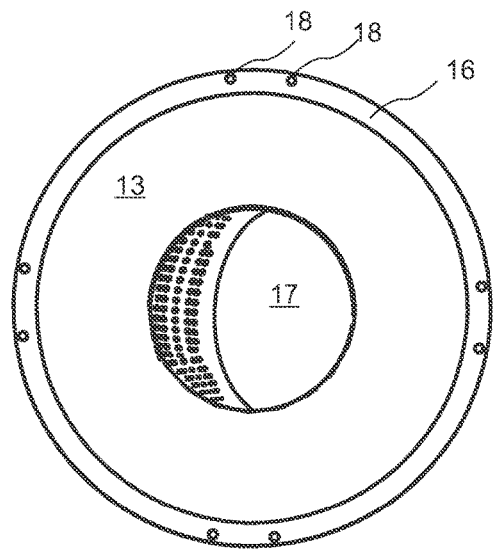
FIG. 2B is a perspective top view the first capture portion of the trap door rodent trap according to the present invention.
Figure 2A:
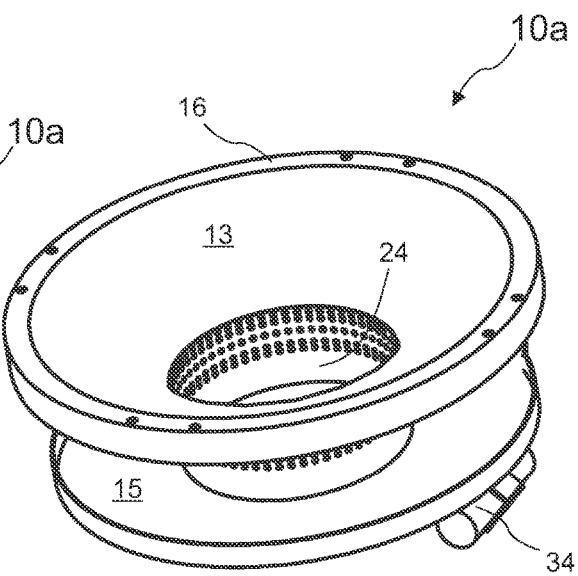
FIG. 2A is a perspective top and side view a first capture portion of the trap door rodent trap according to the present invention.
Figure 3A:
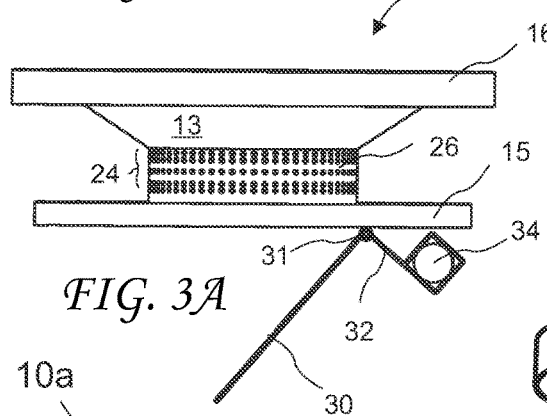
FIG. 3A is a side view the first capture portion of the trap door rodent trap according to the present invention
Figure 2C:
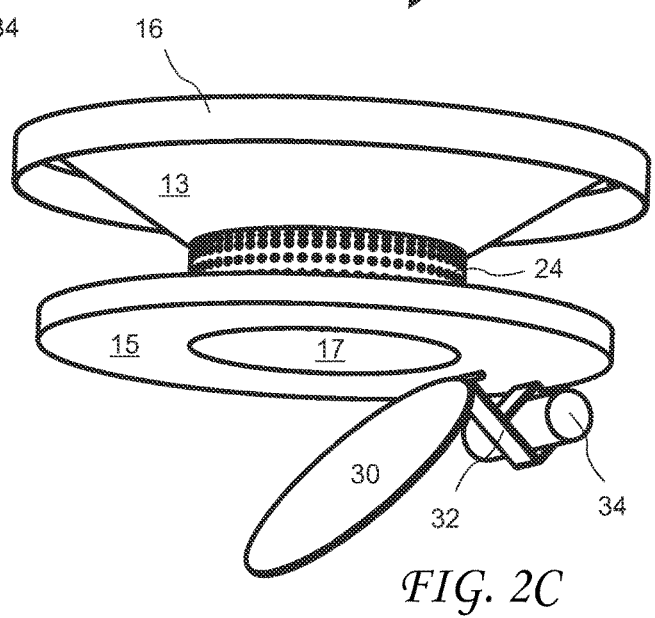
FIG. 2C is a perspective bottom and side view the first capture portion of the trap door rodent trap according to the present invention.
Figure 3B:
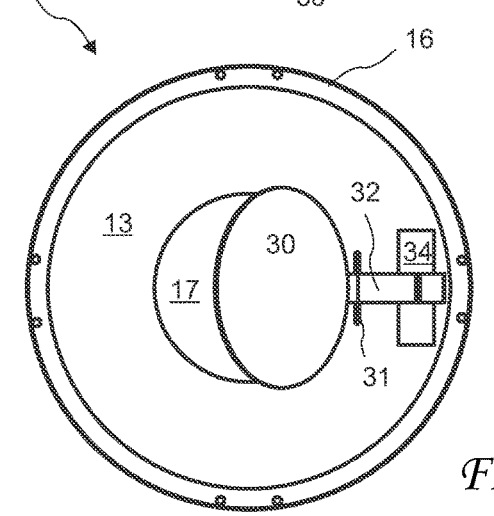
FIG. 3B is a bottom view the first capture portion of the trap door rodent trap according to the present invention

A perspective top and side view a first capture portion 10a of the trap door rodent trap assembly 10 is shown in FIG. 2A, a perspective top view the first capture portion 10a of the trap door rodent trap assembly 10 is shown in FIG. 2B, a perspective bottom and side view the first capture portion 10a of the trap door rodent trap assembly 10 is shown in FIG. 2C, a side view the first capture portion 10a of the trap door rodent trap assembly 10 is shown in FIG. 3A, and a bottom view the first capture portion 10a of the trap door rodent trap assembly 10 is shown in FIG. 3B.

The first capture portion 10a includes a piano-convex lens 13 having a convex curved top 13a (see FIG. 8A) reaching in and down from a rim 16 to a passage 17. The piano-convex lens 13 starts with a gradual slope at the rim 16 which increases towards the passage 17. The gradual slope gives a feeling of safety to rodents, and when the rodents proceed further, the steep slope near the passage 17 causes the rodents to stumble through the passage 17 and into the bucket 12 below. The piano-convex lens 13 preferably is a clear blue colored transparent material and includes a closed perimeter. The weight of the rodent opens a trap door 30 under the passage 17. Pairs of pin holes 18 in the rims 16 are provided to attach the ramps 14.

A perforated center column 24 is below the piano-convex lens 13 and includes perforations 26 allowing rodents to sense rodent attracting scents from bait trays 20 (see FIGS. 6 and 7). The trap door 30 under a rimmed, horizontal platform 15 at the base of the passage 17 is biased to a horizontal position closing the passage 17 by a weight 34. The trap door 30 is preferrably blue. The weight 34 is attached to an arm 32 reaching opposite to the trap door 30. The trap door 30, arm 32, and weight 34 pivot about an axle 31. The weight 34 is preferably about 200 grams or about 32 mm long and 25 mm in diameter and is preferably a metal rod. The rimmed, horizontal platform 15 at the bottom of the perforated center column 24 supports the bait trays 20 (see FIG. 6).

A perspective bottom and side view a second capture portion 10b of the trap door rodent trap 10 is shown in FIG. 4A, a side view the second capture portion 10b is shown in FIG. 4B, and a bottom view the second capture portion 10b is shown in FIG. 4C. The second capture portion 10b includes the piano-convex lens 13, the perforated center column 24, and the rimmed, horizontal platform 15 of the first capture portion 10a, but the trap door 30 is biased to the horizontal position by a spring 36. The platform 15 includes an outside rim 15a.

Figure 5:
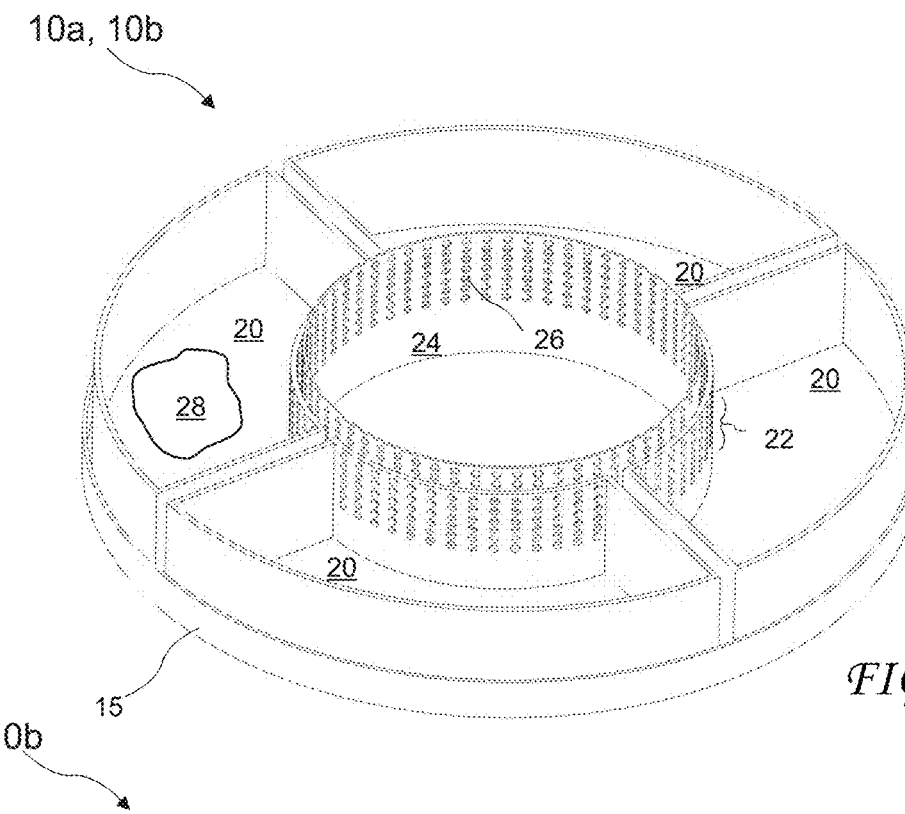
FIG. 5 is a perspective top view of a perforated center column of the first capture portion and bait trays resting on the platform, according to the present invention.

A perspective top view of the perforated center column 24 and bait trays 20 resting on the platform 15 is shown in FIG. 5. The perforations 26 in the perforated center column 24 are aligned with the bait tray perforations 26 to release attracting scents from bait 28 in the bait trays 20 into the passage 17 to attract rodents.

Figure 6:
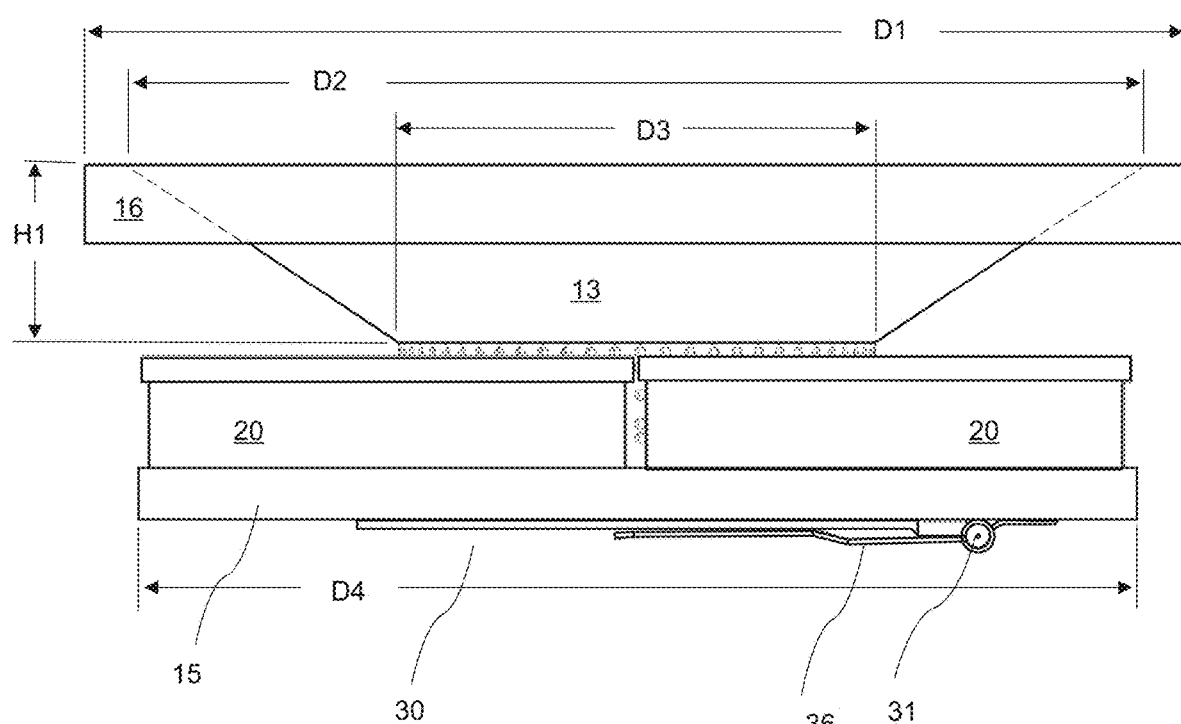
FIG. 6 is a side view of the second capture portion of the trap door rodent trap according to the present invention showing bait trays under the piano-convex lens.

A side view of the second capture portion 10b showing bait trays 20 under the piano-convex lens 13 is shown in FIG. 6. The rim 16 has an outside diameter D1, the piano-convex lens 13 has an outside diameter D2 and inside diameter D3, the perforated center column 24 also has the diameter D3, and the platform 15 has an outside diameter D4. The piano-convex lens 13 has a height H1. The diameter D1 is preferably about 31 cm. The diameter D2 is preferably about 28 cm. The diameter D3 is preferably about 15 cm. The diameter D4 is preferably about 28 cm. The height H1 is preferably about 6.25 cm.

Figure 7:
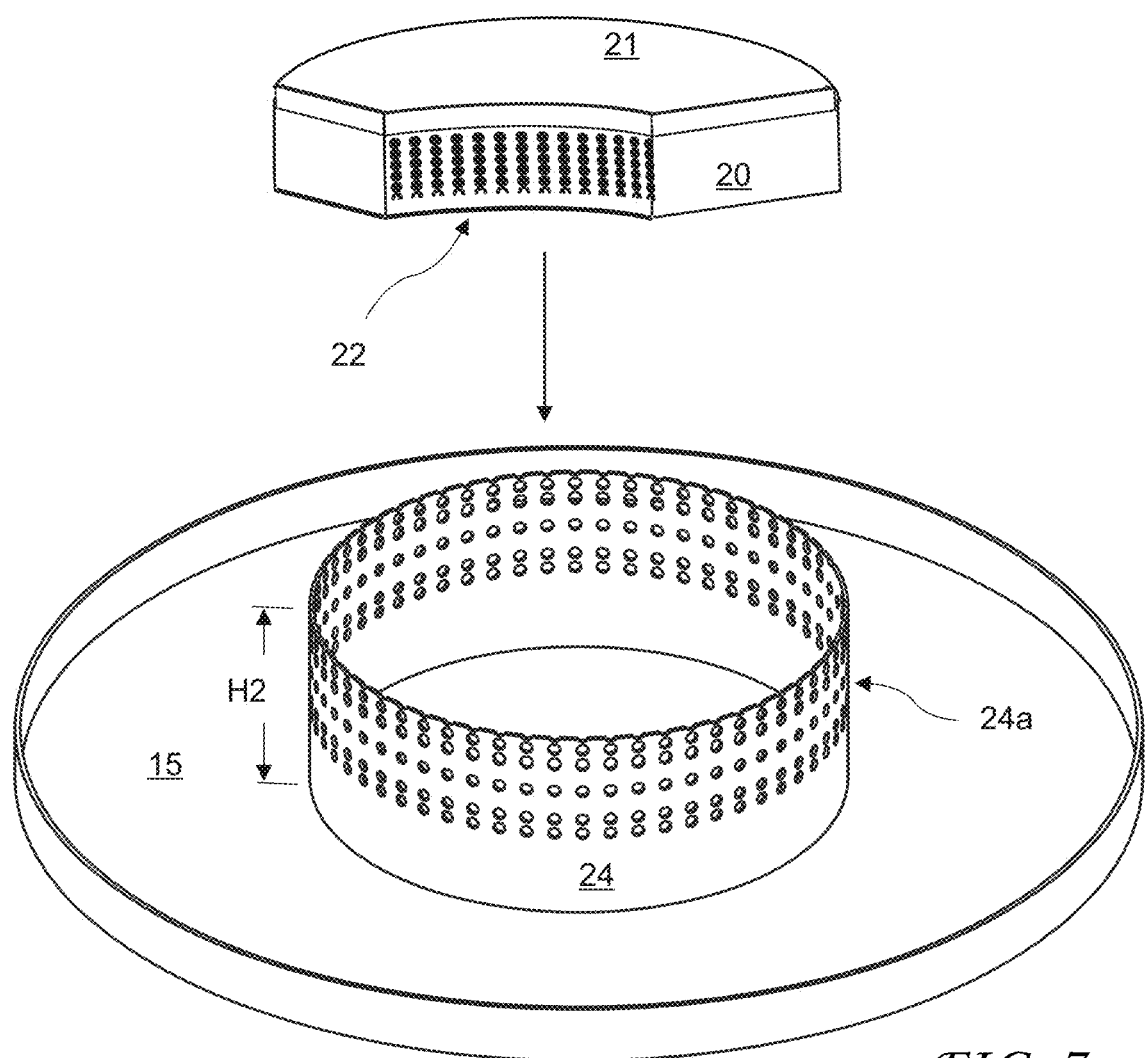
FIG. 7 shows one bait tray and a bait tray platform and a perforated center column of the trap door rodent trap according to the present invention.

A bait tray 20 including a cover 21 is shows above the bait tray platform 15 in FIG. 7. The cover 21 is a transparent blue material to allow rodents to see the bait 28 (see FIG. 5) inside the bait tray 20. The perforated center column 24 has a height H2 of preferably about 4.75 cm and includes perforations 26.

Figure 8B:
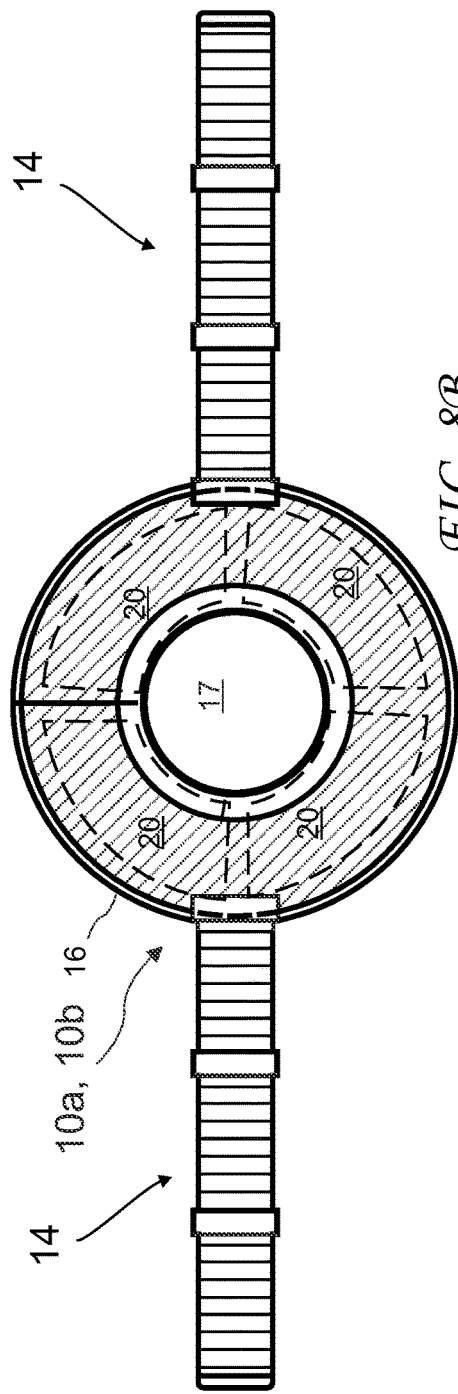
FIG. 8B shows a top view of the trap door rodent trap containing the bait trays according to the present invention.
Figure 8A:
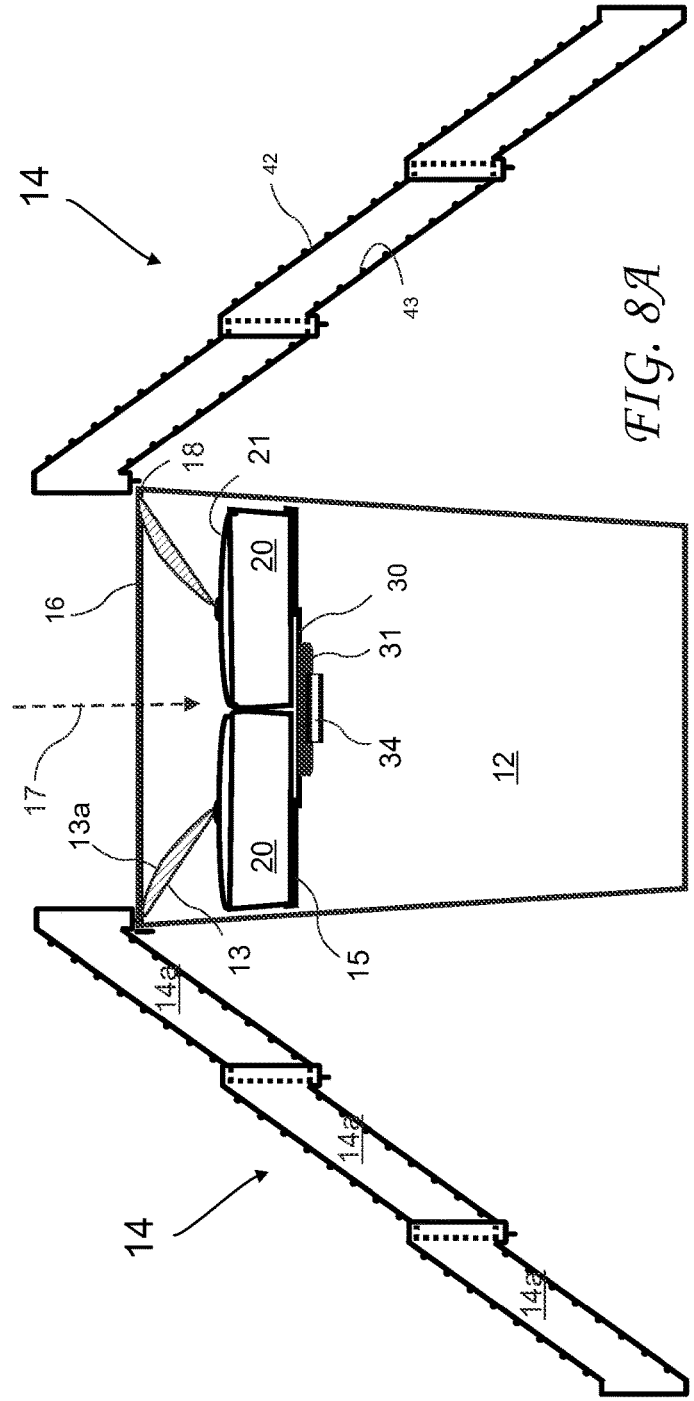
FIG. 8A shows a side view of the trap door rodent trap containing the bait trays according to the present invention.

A side view of the capture portion 10a, the bait trays 20, and the ramps 14, are shown in FIG. 8A and a top view of the second capture portion 10b showing the bait trays 20 is shown in FIG. 8B. The bait trays 20 form a circle around the perforated center column 24 and bait tray perforations 26 are aligned with the perforations 26 (see FIG. 7) in the perforated center column 24 to release attracting scents from bait 28 in the bait trays 20 into the passage 17.

A side view of a ramp section 14a of the ramps 14 is shown in FIG. 9A, a front view of the ramp section 14a is shown in FIG. 9B, a rear view of the ramp section 14a is shown in FIG. 9C, and a top view of the ramp section 14a is shown in FIG. 9D. Pins 48 reaching down from the upper mouth 52 engage the pin holes 18 in the rim 16 (see FIGS. 2B and 4C) to attached the ramps 14 to the capture portion 10a or 10b. The ramp section 14a has an overall height H3, an upper mouth 52 height H4 and width W1, a lower mouth 54 height H5 and width W2. The height H3 is about 24 cm, the weight H4 is about 6 cm, the width W1 is about 5 cm, the height H5 is about 5 cm, and the width W2 is about 4 cm A top and front view of the bait tray 20 with the cover 21 removed is shown in FIG. 10. An inner surface of the bait tray 20 includes the bait tray perforations 26. The bait tray 20 has a height H6, an inner radius R1 and outer radius R2, and an angular extent A1. The height H6 is preferably about 4.75 cm, the inner radius R1 is preferably about 7 cm, the outer radius R2 is preferably about 14 cm, and the angular extent A1 is preferably about 90 degrees.

A side view of the trap door 30 and weights 34 is shown in FIG. 11A and top view of the trap door 30 and weights 34 is shown in FIG. 11B. The trap door 30 has a diameter D5 and an edge of the trap door 30 approximately reached to the axle 31. The weight 34 is a height H7 below the axle 31 opposite to the trap door 30. The diameter D5 is preferably about 14 cm and the height H7 is preferably about 4.5 cm.

All or part of the rim 16, Plano-convex lens 13, platform 15, center column 24, and platform 15, are preferably a single piece of transparent, blue PET plastic. The bait containers 20 and covers are also preferrably made of transparent, blue PET plastic. The trap door 20 and ramp sections 14 are preferably made of blue HDPE plastic.

While the invention herein disclosed has been described by means of specific embodiments and applications thereof, numerous modifications and variations could be made thereto by those skilled in the art without departing from the scope of the invention set forth in the claims.

I claim:
1. A trap door rodent trap, comprising:
a trap rim configured to reside on top of a bucket;
at least one ramp configured to reside outside the bucket, the ramp configured to reach up proximal to the trap rim;
a top opening in the trap rim;

an entry reaching in and down from the top opening, the entry having an open bottom;
an entry passage through the open bottom of the entry;
a column reaching down from the entry passage;
column perforations in the column;
a column interior of the column continuing down from the entry passage through the column to a bottom of the column;
a platform at the bottom of the column;
a platform opening in the platform aligned with the column interior; and
bait trays on the platform and outside the column, the bait trays in fluid communication with the column interior through the column perforations,
wherein:
the bait trays are configured to reside on the platform between a bucket interior surface of the bucket and the column; and
an inner surface of the bait trays includes bait tray perforations cooperating with the column perforations and a bait tray interior is in fluid communication with the column interior serially through the bait tray perforations and the column perforations.

2. The rodent trap of claim 1, wherein the entry is a lens reaching in and down from the trap rim.

3. The rodent trap of claim 2, wherein the lens is a piano-convex lens having a convex top surface, the piano-convex lens being thicker at a center and thinner at a top and a bottom, having a first slope approaching the trap rim and a second slope approaching the column, the second slope being steeper than the first slope.

4. The rodent trap of claim 2, wherein each bait tray resides entirely below the lens.

5. The rodent trap of claim 4, wherein each bait tray is made of a blue material.

6. The rodent trap of claim 2, wherein the lens is thicker at a center portion and thinner at a top and a bottom.

7. The rodent trap of claim 6, wherein the lens is generally frusto-conical in shape.

8. The rodent trap of claim 1, further including a trap door hingedly attached to the platform, wherein the trap door is urged by a counter weight to close upward against a platform bottom closing the platform opening.

9. The rodent trap of claim 1, further including a trap door hingedly attached to the platform, wherein the trap door is urged by a spring to close upward against a platform bottom closing the platform opening.

10. The rodent trap of claim 1, wherein a bait tray cover closes a top of each bait tray.

11. The rodent trap of claim 10, wherein the bait tray cover is made of a blue transparent material.

12. The rodent trap of claim 1, wherein the bait trays comprise four bait trays.

13. The rodent trap of claim 1, wherein each bait tray includes a closed bottom, closed sides, a closed outer surface and the perforated inner surface.

14. The rodent trap of claim 1, wherein the column is a vertical cylinder.

15. The rodent trap of claim 1, further including the trap door hingedly attached to the platform and urged to close upward, closing the platform opening.

16. A trap door rodent trap, comprising:
a trap rim residing on top of a bucket;
at least one ramp outside the bucket, the ramp configured to reach up proximal to the trap rim;
a top opening in the trap rim;
a transparent piano convex lens reaching in and down from the top opening;
a lens passage through an open bottom of the piano convex lens;
a vertical column reaching down from the lens passage;
column perforations in the column;
a column interior of the column continuing down from the lens passage through the column to a bottom of the column;
a platform at a bottom of the column;
a platform opening in the platform aligned with the column interior;
bait trays on the platform, the bait trays outside the column and in fluid communication with the column interior through the column perforations; and
a trap door hingedly attached to the platform and urged to close upward against the platform closing the platform opening.

17. A trap door rodent trap, comprising:
a trap rim residing on top of a bucket;
at least one ramp outside the bucket, the ramp configured to reach up proximal to the trap rim;
a top opening in the trap rim;
a transparent piano convex lens made of transparent blue material and reaching in and down from the top opening;
a lens passage through an open bottom of the piano convex lens;
a vertical column reaching down from the lens passage;
column perforations in the column;
a column interior of the column continuing down from the lens passage through the column to a bottom of the column;
a rimmed horizontal platform at a bottom of the column;
a platform opening in the platform aligned with the column interior;
bait trays resting on the platform, the bait trays residing between an outside rim of the platform and the column;
an inside radius of the bait trays including bait tray perforations cooperating with the column perforations and a bait tray interior in fluid communication with the column interior serially through the bait tray perforations and the column perforations; and
a trap door hingedly attached to the platform and urged to close upward against the platform closing the platform opening.

* * * * *